(12) United States Patent
Kiura

(10) Patent No.: US 8,732,774 B2
(45) Date of Patent: May 20, 2014

(54) VIDEO SERVER FOR CONTROLLING VIDEO SIGNAL OUTPUT AND VIDEO SIGNAL OUTPUT CONTROL METHOD

(71) Applicant: Kabushiki Kaisha Toshiba, Tokyo (JP)

(72) Inventor: Kenichi Kiura, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/752,780

(22) Filed: Jan. 29, 2013

(65) Prior Publication Data

US 2013/0276038 A1      Oct. 17, 2013

(30) Foreign Application Priority Data

Apr. 12, 2012   (JP) .................................. 2012-091239

(51) Int. Cl.
*H04N 7/173*     (2011.01)

(52) U.S. Cl.
USPC ................... 725/88; 725/91; 725/92; 725/93; 725/94; 725/102; 725/103; 725/114; 725/115

(58) Field of Classification Search
USPC ..................................................... 725/88–94
See application file for complete search history.

(56) References Cited

U.S. PATENT DOCUMENTS

| 5,508,732 | A | * | 4/1996 | Bottomley et al. ............. | 725/93 |
| 5,603,058 | A | * | 2/1997 | Belknap et al. ................. | 710/35 |
| 5,815,146 | A | * | 9/1998 | Youden et al. ................. | 715/720 |
| 7,174,561 | B2 | * | 2/2007 | Bixby et al. .................... | 725/93 |
| 2010/0290760 | A1 | * | 11/2010 | Dachiku ....................... | 386/345 |

FOREIGN PATENT DOCUMENTS

JP        2009-118432         5/2009

* cited by examiner

*Primary Examiner* — Mark D. Featherstone
*Assistant Examiner* — Akshay Doshi
(74) *Attorney, Agent, or Firm* — Oblon, Spivak, McClelland, Maier & Neustadt, L.L.P.

(57) ABSTRACT

A video server to transmit a plurality of video information, set to a the decode processing mode, the decode processing mode including a combination of allocation, a decoding method, and a buffering method, an allocation indicating which read port of a storage the designated content is output from, the decoding method being for a plurality of decoders, the buffering method being for a plurality of output buffers, the decoding method and the buffering method being based on each of the output modes, and to output a control signal with reference to an identification information depending on the set connection pattern and the set decode processing mode so that connection between an output interface port and an allocated read port is established, the control signal setting the destination of each of the selectors.

8 Claims, 8 Drawing Sheets

VIDEO SERVER FOR CONTROLLING VIDEO SIGNAL OUTPUT AND VIDEO SIGNAL OUTPUT CONTROL METHOD

CROSS-REFERENCE TO RELATED APPLICATIONS

This application is based upon and claims the benefit of priority from the prior Japanese Patent Application No. 2012-091239, filed on Apr. 12, 2012, the entire content of which is incorporated herein by reference.

FIELD

The present embodiments generally relate to a video server for multi-channel output that is used in a broadcast station or the like, and a video signal output control method thereby.

BACKGROUND

Large-volume content is stored in a content server in a broadcast station. Content to be broadcasted is transferred to storage in a transmission server, and is stored in preparation for the broadcast of a program.

FIG. 13 is a functional block diagram for explaining an operation of an existing transmission server.

As shown in FIG. 13, a transmission server 100 reads content of a program on the air from storage 101. The transmission server 100 transmits a video signal in a first system, which is decoded by a first decoder 30(#1), to a transmitting apparatus through, for example, an OA (on-the-air) line via an external switcher 220. At the same time, a second decoder 30(#2) reads and decodes next broadcast content data from the storage 101. An output signal from the second decoder 30(#2) is transmitted to a NEXT line of a switcher 230 as an output in a second system, and is in a standby status for airplay.

Since the decoder 30(#1) is connected to the OA line, the decoder 30(#1) turns off the internal buffer and outputs decoded data without buffering. The decoder 30(#2) is, however, connected to the NEXT line that prepares for the next OA, and turns on the internal buffer. In a case where a decoder has no internal buffer, the decoder is connected to an external output buffer 40(#m) via the switcher 220, and the external output buffer 40(#m) is connected to the switcher 230.

Moreover, the transmission server 100 further includes a plurality of decoders and stores standby content as second and third preliminary content as necessary. A broadcast station plays back the standby content to confirm whether the content is stored properly, or to search for a transmission start point in the content prior to the OA. The confirmation takes the same time as the broadcast of the content. Data is thinned out and decoded to thereby play back the data in a fast-forward playback, in order to reduce the confirmation time and check content easily. However, the method has a disadvantage in that a problem or deterioration of details may be missed. Alternatively, in an independent apparatus for playing back a video signal, two apparatuses such as decoders 30(#n and #n−1) alternately read the same data to thereby perform fast-forward playback or backward playback (see, for example, Japanese Patent Application Laid-open No. 2009-118432, contents of which are hereby incorporated by reference). However, the method has a problem in that a system configuration is large because an external buffer is connected via an external switcher, and switching or operation control is complicated, i.e., control of the fast-forward playback or the backward playback of the content recorded in the transmission server is difficult.

There has been a problem in that it is difficult to confirm content recorded in an existing transmission server by a fast-forward playback or a backward playback.

It is desirable to provide a video server for multi-channel output that is capable of reading stored video content data and transmitting the data to an OA line while performing fast-forward playback and backward playback of other stored video content data such that a user confirms the other stored video content data, and a video signal output control method by the video server.

DETAILED DESCRIPTION

Figure 1:
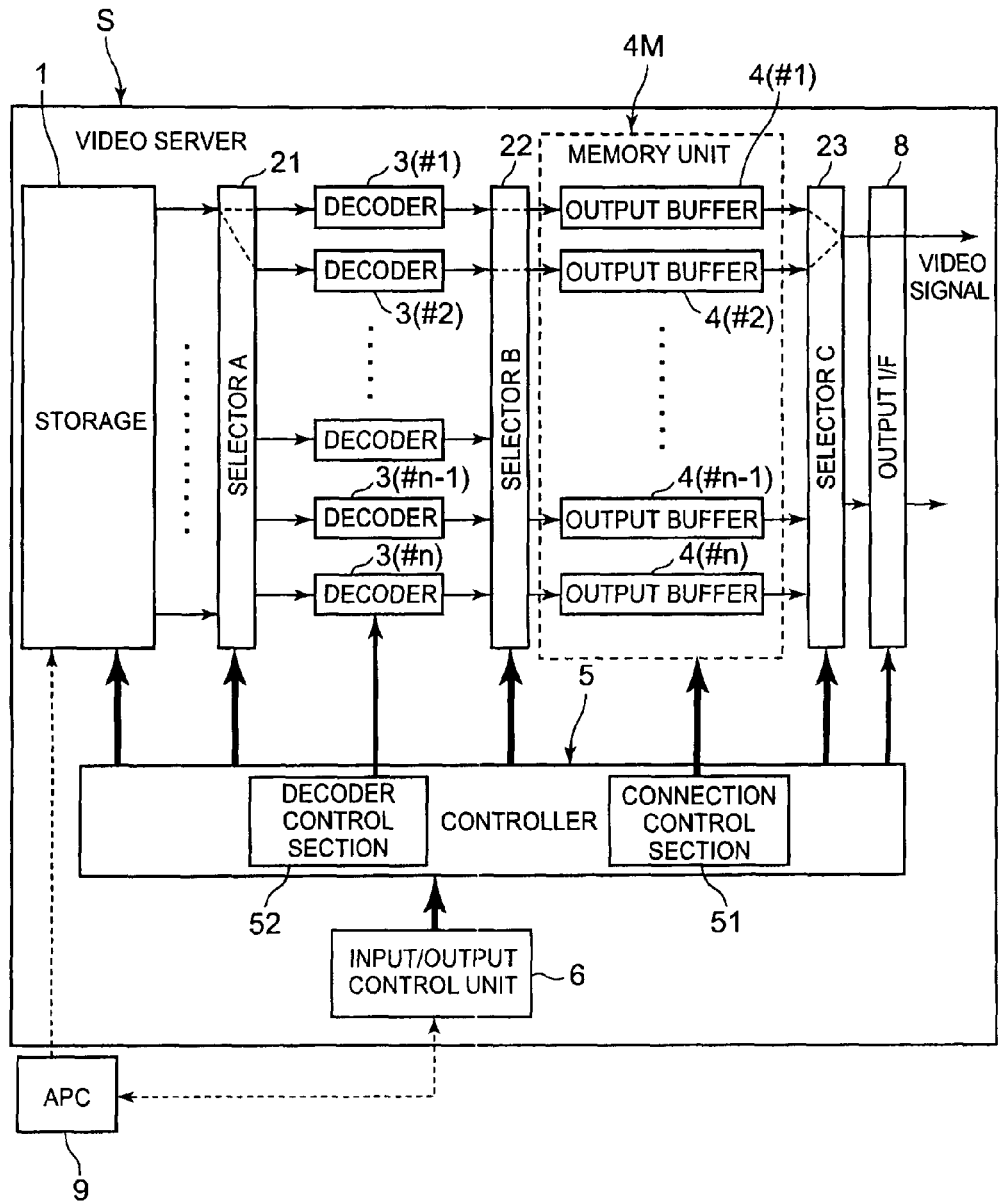
FIG. 1 is a functional block diagram for explaining an operation of a video server according to an embodiment of the present invention.

In view of the above circumstances, it is provided that a video server for multi-channel output, the video server being configured to transmit a plurality of pieces of video information, includes a plurality of output interface ports for video information, each of the plurality of output interface ports having an identification number; storage capable of storing a plurality of pieces of content data, the storage including a plurality of read ports, the storage being configured to output designated content data from an allocated read port; a plurality of decoders configured to decode and output the input designated content data, each of the plurality of decoders having unique identification information; a plurality of output buffers configured to buffer the data and output the buffered data, or to output the data without buffering, in accordance with a decode processing mode, the data being input via at least one of the plurality of decoders, each of the plurality of output buffers having unique identification information; a first selector configured to selectively establish connection between at least one of the read ports of the storage and at least one of inputs of the plurality of decoders in accordance with a control signal, the control signal setting a destination to be input; a second selector configured to selectively establish connection between at least one of outputs of the plurality of decoders and at least one of inputs of the plurality of output buffers in accordance with the control signal; a third selector configured to selectively establish connection between at least one of outputs of the plurality of output buffers and at least one of the plurality of output interface ports in accordance with the control signal; an input device configured to input a content name of the video information, the video information being output from each of the output interface port, and to designate an output mode of the video information to one of an OA mode, a NEXT mode, a fast-forward playback mode, and a backward playback mode, the video information being output from the output interface port; and a controller configured to receive the output mode designated by the input device, to set a connection pattern based on each of the output modes, the connection pattern including combination between the plurality of decoders and the plurality of output buffers, the plurality of decoders decoding data, to set the decode processing mode, the decode processing mode including a combination of allocation, a decoding method, and a buffering method, the allocation indicating which read port of the storage the designated content is output from, the decoding method being for the plurality of decoders, the buffering method being for the plurality of output buffers, the decoding method and the buffering method being based on each of the output modes, and to output the control signal with reference to each piece of the identification information depending on the set connection pattern and the set decode processing mode so that connection between the output interface port and the allocated read port is established, the control signal setting the destination of each of the selectors.

In view of the above circumstances, it is provided that a video signal output control method by a video server for multi-channel output, the video server being configured to transmit a plurality of pieces of video information, the video server including an input device, a controller, storage, a plurality of decoders, a plurality of output buffers, a first selector, a second selector, a third selector, and a plurality of output interface ports, the method comprising: notifying, by the input device, the controller of designation of an input content name of content data to be output from one of the plurality of output interface ports to be designated, and designation of a selection of an output mode of each of the plurality of pieces of video information to one of an OA mode, a NEXT mode, a fast-forward playback mode, and a backward playback mode, one of the plurality of output interface ports outputting the video information; receiving, by the controller, the output mode notified by the input device, setting, by the controller, a connection pattern based on each of the output modes, the connection pattern including combination between the plurality of decoders and the plurality of output buffers, setting, by the controller, a decode processing mode, the decode processing mode including a combination of allocation, a decoding method, and a buffering method, the allocation indicating which read port of the storage the designated content is output from, the decoding method being for a decoder connected to the allocated read port, the decoding method being based on each of the output modes, the buffering method being for the plurality of output buffers, and performing, by the controller, connection setting of the first selector, the second selector, and the third selector depending on the set connection pattern and the set decode processing mode so that connection between the designated output interface port and the allocated read port is established; outputting, by the storage, the designated content data to the allocated read port, the storage being capable of storing a plurality of pieces of content data; establishing, by the first selector, connection between the read ports of the storage and inputs of the plurality of decoders in accordance with the connection setting; establishing, by the second selector, connection between outputs of the plurality of decoders and inputs of the plurality of output buffers in accordance with each of the connection setting; establishing, by the third selector, connection between outputs of the plurality of output buffers and the plurality of each output interface ports in accordance with the connection setting; decoding, by the decoder connected to the read port via the first selector, input content data depending on the set output mode, and outputting the data obtained by decoding; buffering data input from the decoder and outputting the buffered data, or outputting data input from the decoder without buffering, by the output buffer connected to the decoder via the second selector, by a method corresponding to the set decode processing mode; and outputting, by the plurality of interface ports connected to the output buffer via the third selector, the data obtained by decoding the designated content data as the video information.

Hereinafter, a video server according to an embodiment of the present invention will be described with reference to the drawings.

FIG. 1 is a functional block diagram for explaining an operation of the video server according to the embodiment.

As shown in FIG. 1, a video server S includes storage 1 that stores a plurality of pieces of broadcast content, a selector A 21, a selector B 22, a selector C 23, decoders 3((#1) to (#n)), output buffers 4((#1) to (#n)), an output interface (I/F) 8, a controller 5, and an input/output control unit 6 (for example, touch panel).

In a case where the video server S is used as a transmission server in a broadcast station, an external APC (automatic program controller) 9 inputs information on selected content to be broadcasted and the like in the video server S via a control-data network (not shown) and the input/output control unit 6.

Connections between the controller 5, the storage 1, the decoders 3, the output buffers 4, the selectors, and the output I/F 8 are established by a bus line or a control signal line (not shown). The controller 5 includes a connection control section 51 and a decoder control section 52. The connection control section 51 selects content information input from the input/output control unit 6 for each selector, controls redirection of the decoders 3 and the output buffers 4 for each selector, and controls transmission timing of a video signal for each selector. The decoder control section 52 controls how the decoder decodes content data read from the storage 1, i.e., a decoding mode such as normal decoding (playback), a fast-forward playback, and a backward playback.

In order to help understanding, FIG. 1 shows each of the selectors A 21, B 22, and C 23 as an independent configuration like a matrix switch. Description will be made in accordance with a flow of a signal. The selector A 21 selects/switches connection between one of a plurality of output ports of the storage 1 and one of the decoders 3, thereby allocating content to each decoder 3, which receives input allocated content and reads the allocated content.

Figure 2:
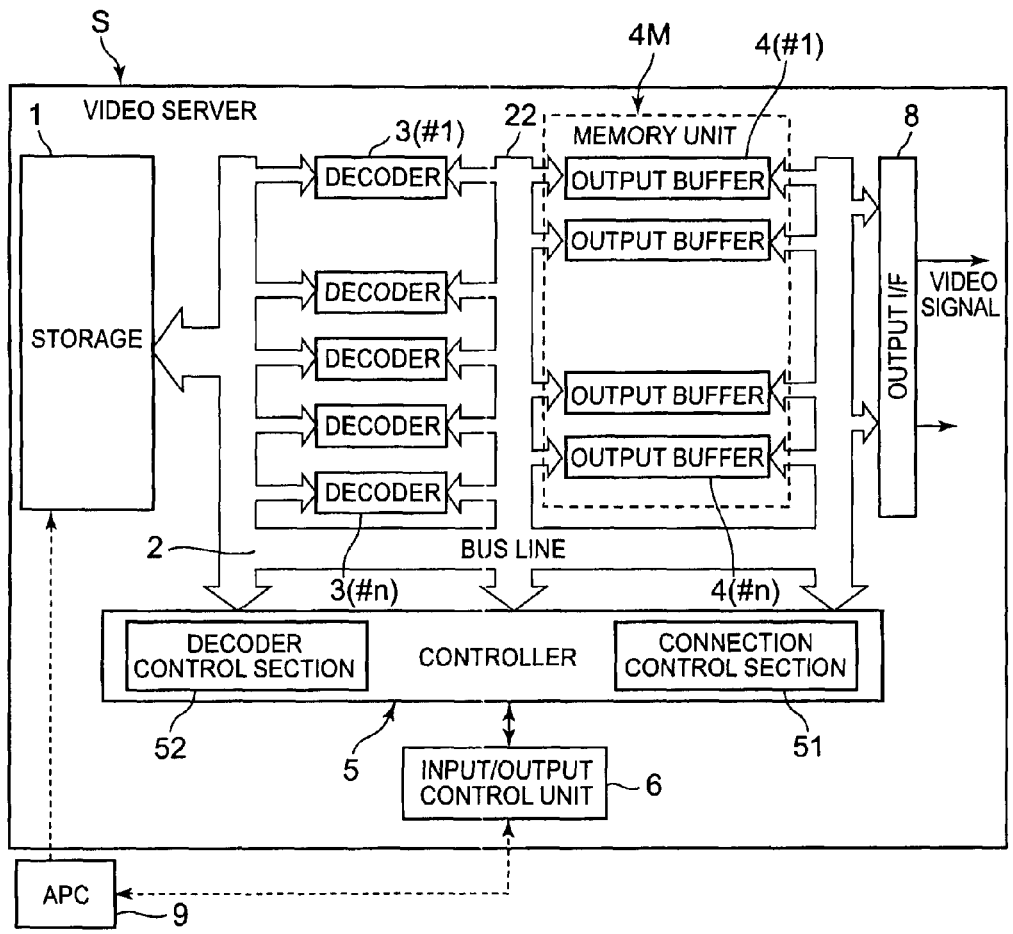
FIG. 2 is a circuit configuration diagram for explaining the operation of the video server according to the embodiment.

FIG. 2 is a circuit configuration diagram. In FIG. 2, content data is input/output to/from the decoders 3 and the output buffers 4 through a physical data bus line as the selectors. Descriptions of components in FIG. 2 same as the components in FIG. 1 will be omitted. A bus line 2 functions as the three selectors in FIG. 1, collectively.

As to selection of data to be decoded by the decoders 3 and output to the outside, the decoder control section 52 and the connection control section 51 of the controller 5 control the timing on the bus line 2 and the selection of an address on the bus line 2, thereby accepting desired data. As a result, it does not need to use a dedicated switcher. So it is possible to establish connections between arbitrary ports of the output I/F 8, the output buffers 4, the decoders 3, and the storage 1, similar to the case where a switcher is used, without increasing the size of the apparatus.

The selector A 21 may temporally divide data output from a physically common port of the storage 1. The storage 1 may read necessary content, the content logically including a plurality of pieces of content.

Moreover, the storage 1 may be one unit, or may include a plurality of HDD units, a plurality of SSD units, or the like. Further, the storage 1 may write and read data via a plurality of ports or a bus line at the same time.

The video server according to the embodiment sets the destinations of the decoders and the buffers (described later) by providing such a selector, and controls the decoding operation of the decoders. As a result, the video server S for multi-channel output is capable of combining various kinds of content video signals output from respective channels depending on each output mode, i.e., an OA mode, a NEXT mode, a fast-forward playback mode, and a backward playback mode.

Moreover, it is desirable for a video server for a broadcast station to have capacity of more than four channels to be capable of simultaneously outputting on-the-air video information (OA mode), video information on the next program (NEXT mode), and stored content in at least one of a fast-forward playback mode and a backward playback mode to confirm the stored content when other content is on the air.

Next, the output mode in which the video server 1 operates depending on the combination of the connections between the decoders and the buffers established by the selector (or bus line) will be described. Here, a basic operation in which a plurality of decoders are used, and a fast-forward playback and a backward playback (decoding) are performed by combining the decoders that are used singularly in the normal OA mode and the NEXT mode will be described. Details of the operating principle of combining a plurality of decoders are described in, for example, Japanese Patent Application Laid-open No. 2009-118432, and are not in the category of the present invention. Therefore, a description thereof will be omitted.

Video data in H.264 encoding format is stored in the storage 1, which is in a form called Open Group of Pictures (GOPs) by compression coding, in a server that stores broadcast program content in a broadcast station. So processing to decode the video data by using information on the previous group of picture (GOP) is necessary when the video data is retransmitted as a video signal.

Figure 3:
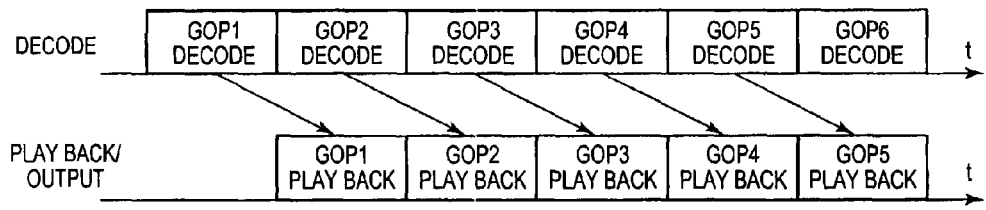
FIG. 3 is a conceptual diagram showing a standard playback video signal output method for outputting video data that has been decoded for each of group of pictures (GOP)

FIG. 3 is a conceptual diagram for explaining a standard playback video signal output method for successively outputting video data that is decoded for each closed GOP. Since the decoding takes time same as the actual time of a material, it may be impossible to decode all the frames and perform a fast-forward playback.

Figure 4:
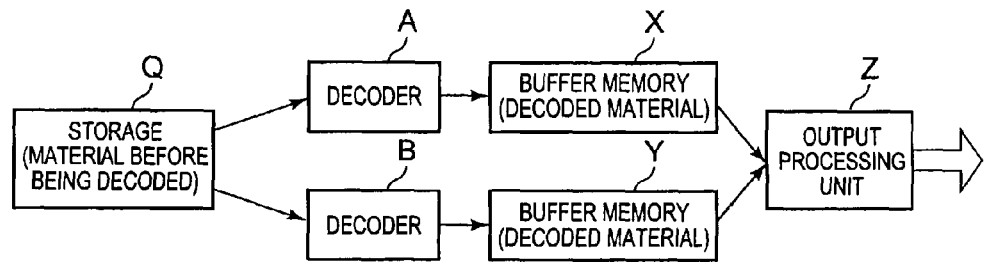
FIG. 4 is a functional block diagram in which two decoders are used to perform a fast-forward playback of content data.

FIG. 4 is a functional block diagram showing a circuit configuration in which two decoders are used to play back and output the same content data.

In FIG. 4, two decoders A and B read, from storage Q, a material before being decoded. The decoders A and B temporarily store the decoded material in buffer memories X and Y, respectively, and an output processing unit Z outputs and plays back the material in accordance with playback order. Therefore, all the frames can be decoded/played back at single or more speed.

It should be noted that the fast-forward playback in this case is not a method in which a synchronous signal and clock speed are increased and data is thinned out, but keeps the clock speed and synchronous timing as they are and alternately reinserts decoded data obtained in two (a plurality of) systems into an original vertical frame. Therefore, information is not decreased by being thinned, and an error is prevented from being missed.

Figure 5:
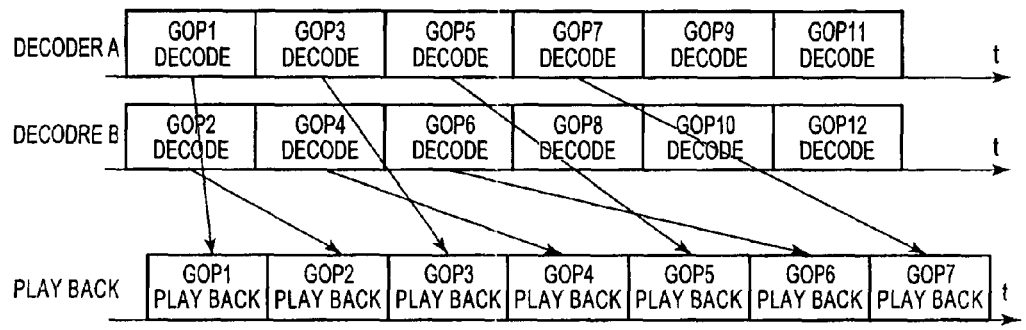
FIG. 5 is a timing chart of decoding and a video signal output in which the two decoders are used to play back data of Closed GOP.

FIG. 5 is a timing chart of decoding and video signal output in which the two decoders are used to play back data of Closed GOPs.

In FIG. 5, the decoder A decodes odd-numbered GOPs (1, 3, 5 . . . ), and the decoder B decodes even-numbered GOPs (2, 4, 6 . . . ). It is possible to play back decoded material at single or more speed by successively playing back the material in order of original number.

Figure 6:
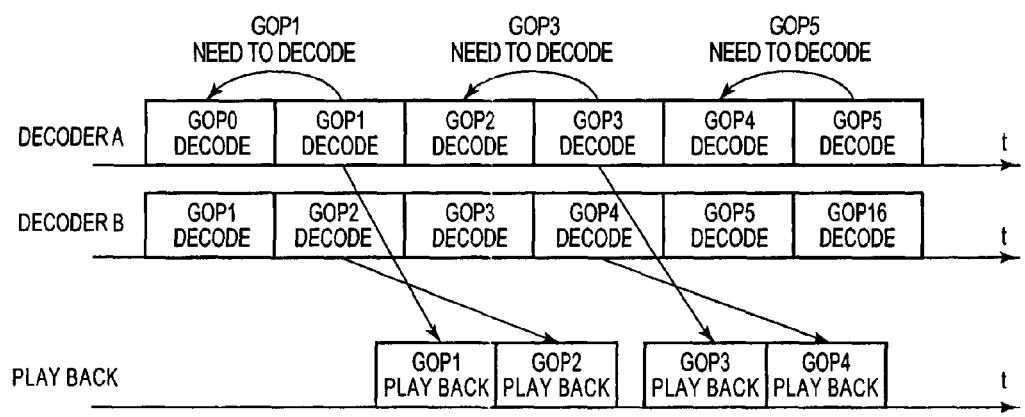
FIG. 6 is a timing chart of decoding and a video signal output in which the two decoders are used to play back data of Open GOP.

FIG. 6 is a timing chart of decoding and video signal output in which the two decoders are used to play back data of Open GOPs.

In FIG. 6, in order to decode a group of picture (GOP), data of a GOP ahead of the GOP to be decoded is referred to, in the Open GOPs. Therefore, it is necessary to at least decode the data of the previous GOP before playing back the data. In FIG. 6, the decoders alternately decode GOPs to be played back. Because it is necessary to also decode the previous GOP of a GOP to be decoded, the reference data causes a loss, and it may be impossible to play back data at more than single speed even at the fastest speed in the case of FIG. 6.

Figure 7:
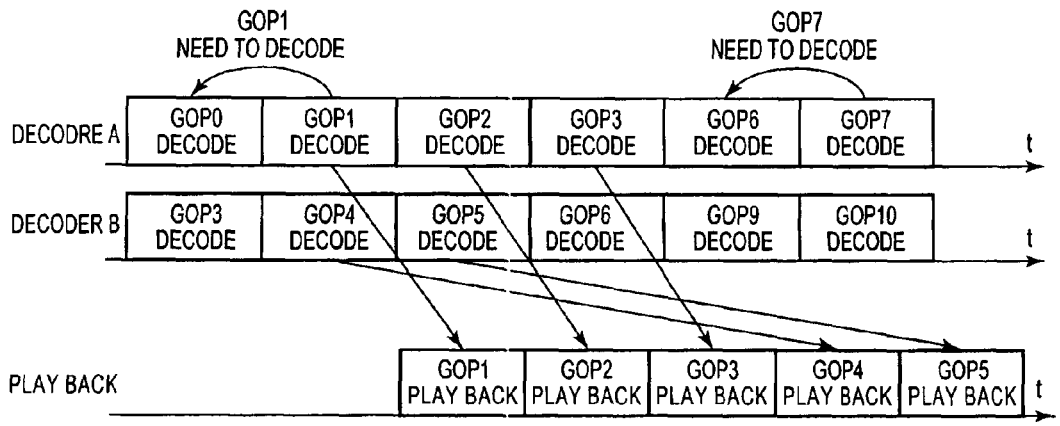
FIG. 7 is a conceptual diagram in which the two decoders are used to decode data for every a plurality of predetermined successive GOPs and the fast-forward playback is performed.

FIG. 7 is a conceptual diagram in which the decoders do not decode data of GOPs alternately, but decode data for every predetermined successive GOPs.

In FIG. 7, in order to reduce a loss caused when the Open GOPs are decoded and played back, the decoders do not decode data of GOPs alternately, but decode data for every predetermined successive GOPs, and the decoded data of GOPs are combined. FIG. 7 is a timing chart in a case where each decoder is switched for every three GOPs. The decoder A decodes the first, second, and third GOPs, and the decoder B decodes the fourth, fifth, and sixth GOPs.

In this case, only one GOP is necessary (referred to) when every three GOPs are decoded. Therefore, data of 3/2 GOPs is processed in a unit time in the case where the GOPs are processed by the two decoders. So it is possible to perform a fast-forward playback at 1.5 times speed at the fastest speed.

It should be noted that if a larger number of decoders that are used at the same time are prepared and the larger number of decoders extract decoded data including a larger number of GOP frames, it is possible to further increase the speed of the fast-forward playback.

Figure 8:
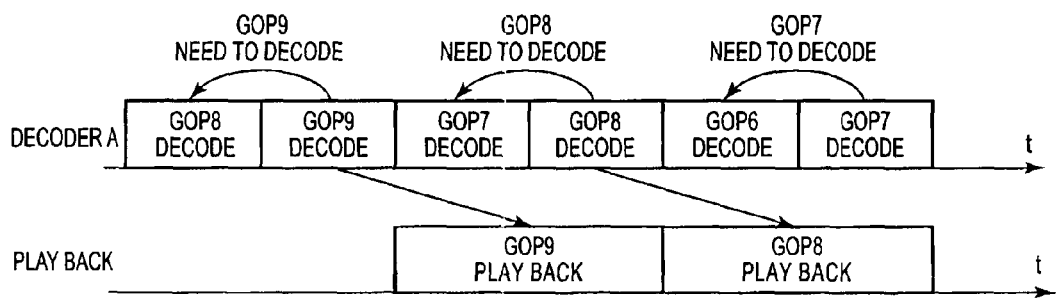
FIG. 8 is a conceptual diagram showing a backward playback method for the Open GOPs.

FIG. 8 is a conceptual diagram showing a backward playback method for the Open GOPs.

In an existing backward playback method for the GOPs shown in FIG. 8, when one decoder decodes data of one GOP, the decoder refers to data of the previous GOP. So a time period for two GOPs is necessary to decode data of one GOP.

Therefore, it may be impossible to decode/play back all the frames at more than 0.5 times speed in the backward playback.

Figure 9:
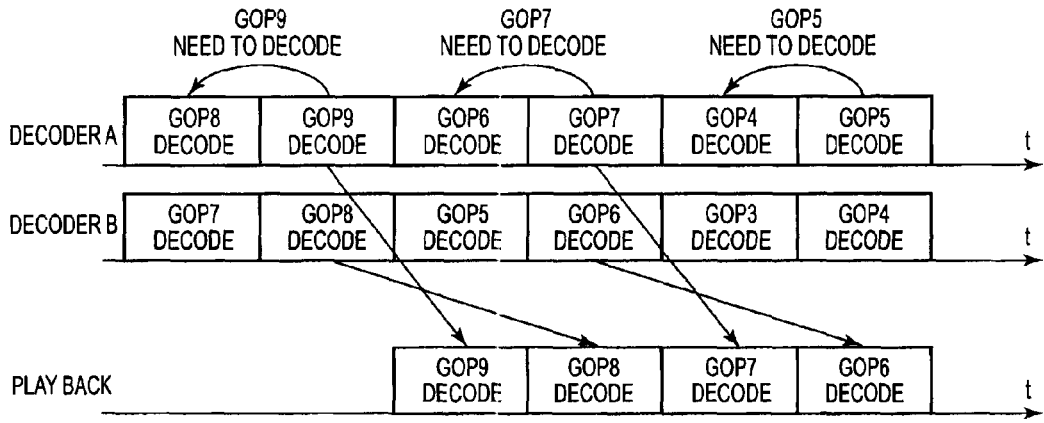
FIG. 9 is a timing chart in a case where the backward playback is performed by the two decoders.

FIG. 9 is a timing chart in a case where a backward playback is performed by using the two decoders.

Two decoders are prepared for a backward playback in FIG. 9. The decoder A and the decoder B alternately read data to be played back from the storage 1. Therefore, two GOPs can be processed by the two decoders at the fastest speed even if the GOPs are the OPEN GOPs, and the data can be alternately extracted. Accordingly, all the frames can be played back/decoded at single speed at the fastest speed.

Now, with reference to FIG. 1 again, processing of the connection setting and the output mode setting in each selector according to the embodiment will be described.

The selector A 21 performs a connection setting between the storage 1 and the decoders. For example, the connection control section 51 of the controller 5 that has received a designation from the input/output control unit 6 performs, in accordance with the designation, a setting of a destination so that the same content data A is input from the storage 1 to the decoder 3(#1) and the decoder 3(#2), in a fast-forward playback mode and a backward playback mode.

In the designation of the OA mode and the NEXT mode, different data, i.e., content data B and content data C, is input to the decoder 3(#1) and the decoder 3(#2), respectively. As described above, the destination is set in accordance with the control of the controller based on the designation from the input/output control unit 6.

The setting performed by the connection control section 51 is normally performed together with the setting performed by the decoder control section 52. In addition to a default setting that decodes data in H.264 format based on a predetermined decoding parameter setting, a thinning fast-forward mode, an alternate selection fast-forward mode, or the like, is set for the decoders. The combination between the decoders and the modes that are used is graphically displayed on the input/output control unit 6 by an information terminal such as a personal computer. Moreover, there are a method in which a pointer or the like is used to set the combinations, a method in which the combinations are switched by a switch on a dedicated control panel, and the like.

The selector B 22 selects/switches a connection between the output of each decoder 3 and the input of each output buffer 4. For example, the selector B 22 causes each output buffer 4 to temporarily store data output from each decoder 3 while maintaining the relationship of one to one between each decoder 3 and each output buffer 4.

The selector C 23 makes selections to establish a system connection between each output buffer 4 and the final output destination, and to output data to the output I/F 8. For example, the selector C 23 alternately extracts data from the output buffer 4(#1) connected to the decoder 3(#1) and from the output buffer 4(#2) connected to the decoder 3(#2), and converts the data to a serial output, when performing a fast-forward playback.

The output I/F 8 is an interface circuit that converts the signal level or format of a video signal output from the selector C 23 into a predetermined signal level or format and outputs the converted signal.

Each selector is capable of selecting/connecting various inputs/outputs as described above, and establishing connections between inputs and outputs in the relationship of N to N at most. Needless to say, the relationship may be limited to a specific combination such as N to (N−α).

In a case where a fast-forward playback is designated in FIG. 1, content data is input to input ports of both of the decoders 3(#1, #2) via the selector A 21. The decoder 3(#1) decodes the content data for every three GOPs from the beginning and outputs the decoded content data to a port for the decoder (#1) of the selector B 22, as a playback mode, as described in FIG. 7. The decoder 3(#2) decodes the content data for the following three GOPs and outputs the decoded content data to a port for the decoder (#2) of the selector B 22. A command to alternately repeat the processing is issued to both of the decoders 3(#1, #2).

The selector B 22 outputs, to the output buffer 4(#1), data input from the decoder 3(#1), and an output terminal of the output buffer 4(#1) is connected to an input port of the selector C 23. Moreover, a similar connection is established for the decoder 3(#2). The selector C 23 alternately selects decoded video data from both of the output buffers 4(#1, #2) for every three GOPs at predetermined timing, and outputs the data to the outside as a video signal for a fast-forward playback.

Moreover, the video server S monitors the data in a fast-forward playback or a backward playback. At the same time, the video server S reads data of content D for OA (on the air) from the storage 1 via the selector A 21, decodes the data by the decoder 3(#n), and transmits a video signal that has passed through the selector B 22, the output buffer 4(#n), and the selector C 23. In this case, the output buffer 4(#n) is set, by the decoder control section 52, to output the data without buffering the data.

Moreover, the video signal for OA may bypass the output buffer 4(#n) in a case where the selector function shown in FIG. 2 is performed by destination control of the bus line 2.

Further, the video server S keeps, in the output buffer 4(#n−1), the front data of the content C for the next broadcast decoded by the decoder 3(#n−1) as the NEXT line signal until the on-air timing comes.

The existing transmission server does not include such decoders and buffers, and outputs signals on the OA line and on the NEXT line by an external switcher. Therefore, the existing transmission server is not able to simultaneously play back all the data in a fast-forward playback or in a backward playback. Moreover, the number of wiring systems that establish connections between switchers, decoders, and the like, is increased around the video server, and the configuration or the signal transmission control is thus complicated.

According to the video server in at least one of the embodiments described above, it is possible to easily provide a small-sized video server that is capable of outputting a monitor playback video signal in addition to an original function of transmitting video signal by including decoders that decode data obtained from storage, output buffers, and selectors that selectively establish connection between the decoders and the output buffers.

In particular, it is possible to realize the small-sized video server by employing the selector function that uses the internal data bus (bus line) shown in FIG. 2.

Figure 10A:
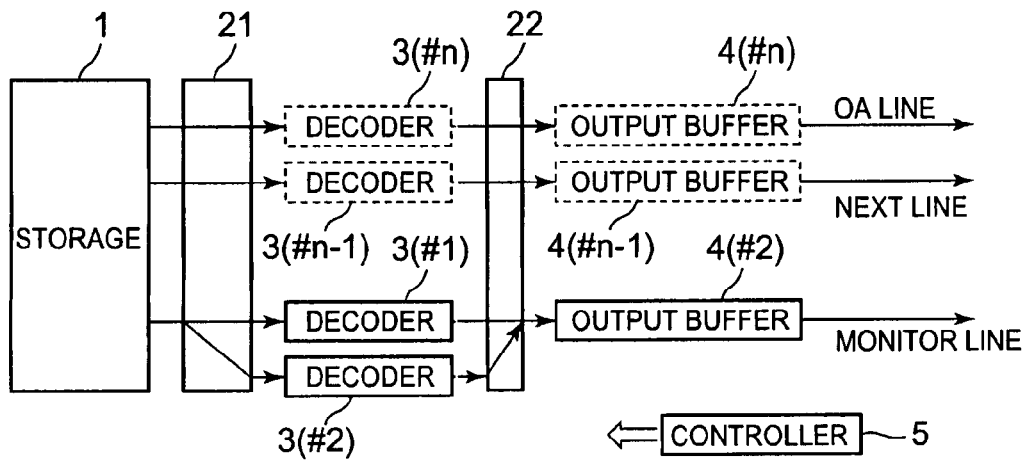
FIGS. 10A-10C show a configuration example of a signal system in a case where the fast-forward playback or the backward playback is performed while changing effective positions of selectors.
Figure 10B:
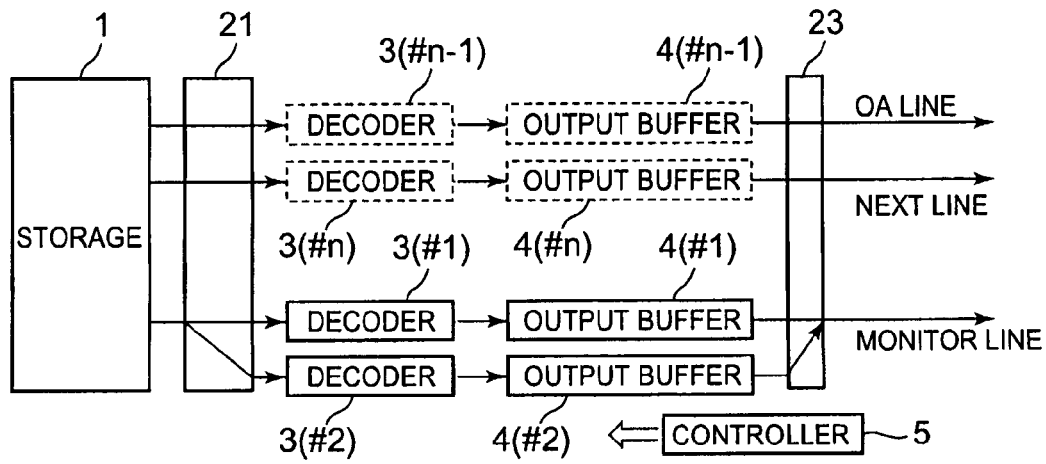
Figure 10C:
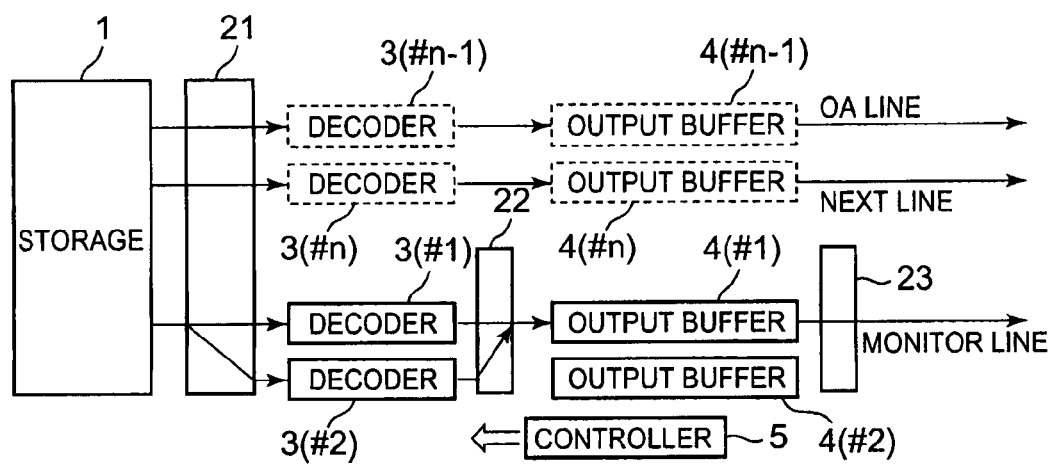

FIG. 10 show application examples of a configuration of a signal system in a case where a fast-forward playback or a backward playback is performed while changing effective positions of selectors. A method in which three selectors are used and decoded data is buffered before being combined by a selector is described above. However, the decoded data may be combined by a selector before being buffered. FIG. 10A logically shows the positions of selectors in a case where the number of selectors is decreased by one, i.e., the selector located on the side of the outputs of the output buffers is not provided. FIG. 10B logically shows the positions of selectors in a case where the number of selectors is decreased by one, i.e., the selector located between the output buffers and the decoders is not provided.

These combinations (connection pattern and decode processing mode) are controlled by the connection control section 51 and the decoder control section 52 that are programmed in the controller 5 in advance.

Figure 11:
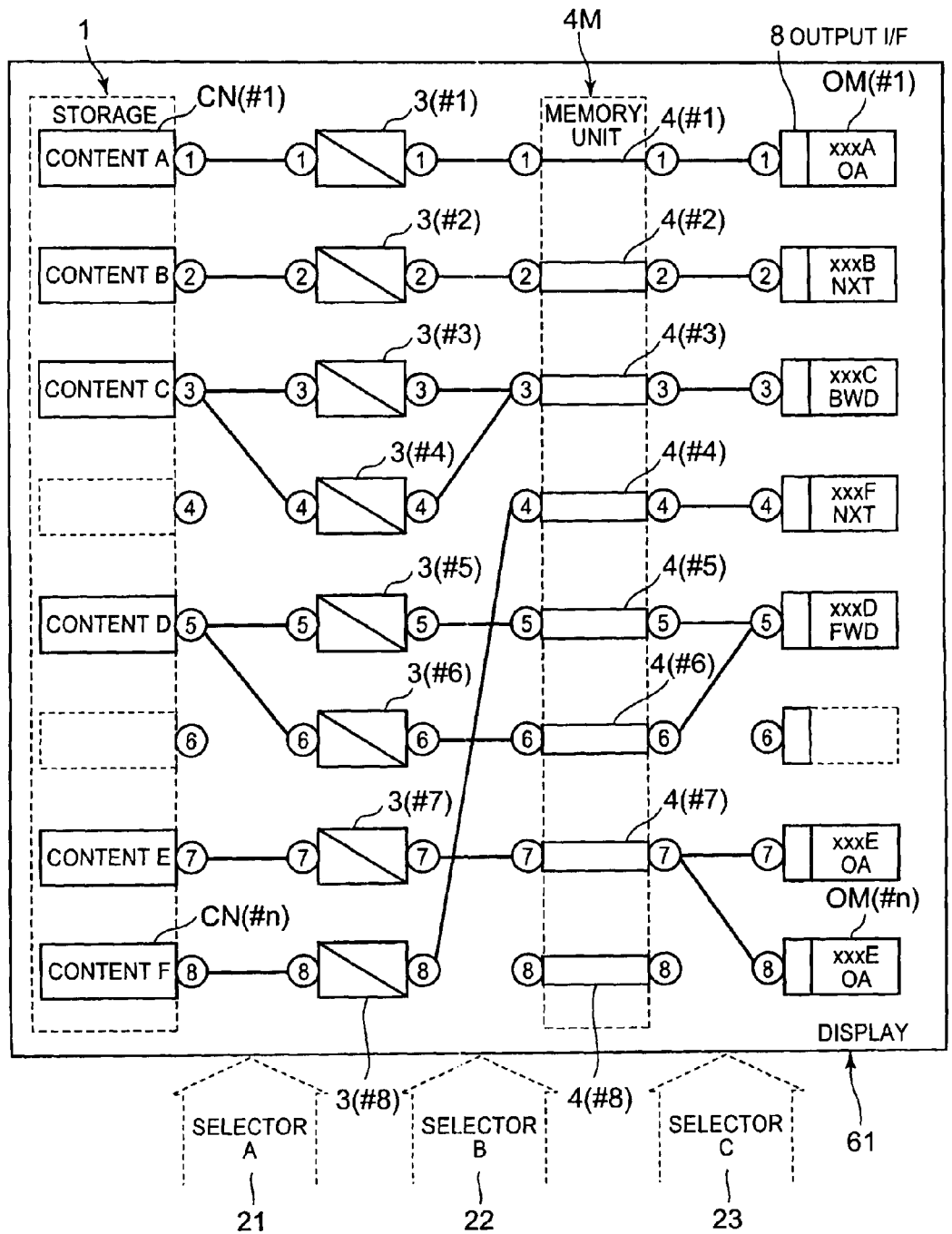
FIG. 11 shows an example of a display screen of a system diagram showing content in the video server according to the embodiment and selections of a video output mode and an output interface port.
Figure 12:
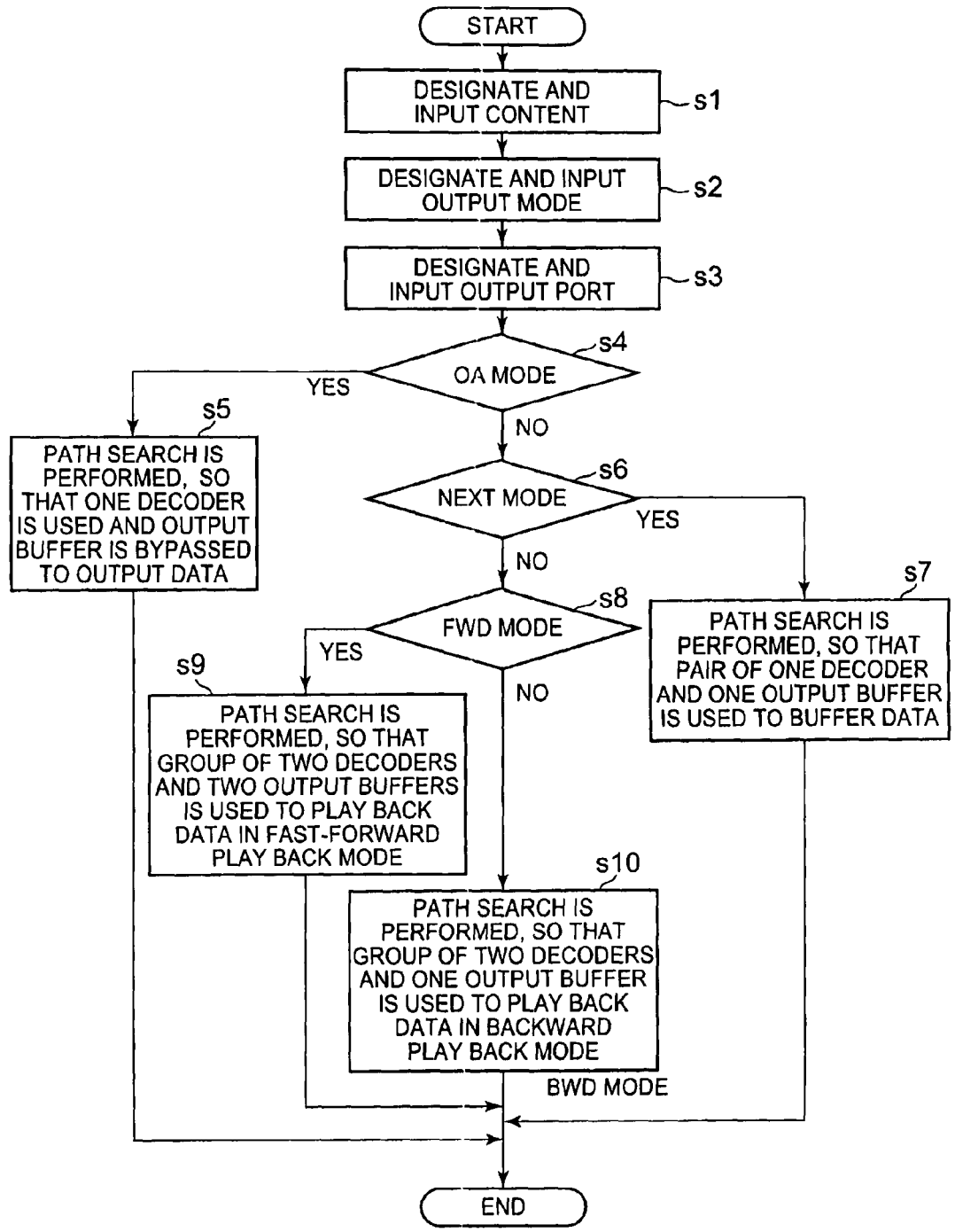
FIG. 12 is a flowchart of a processing procedure of the video server according to the embodiment that operates in a multi-mode operation manner.
Figure 13:
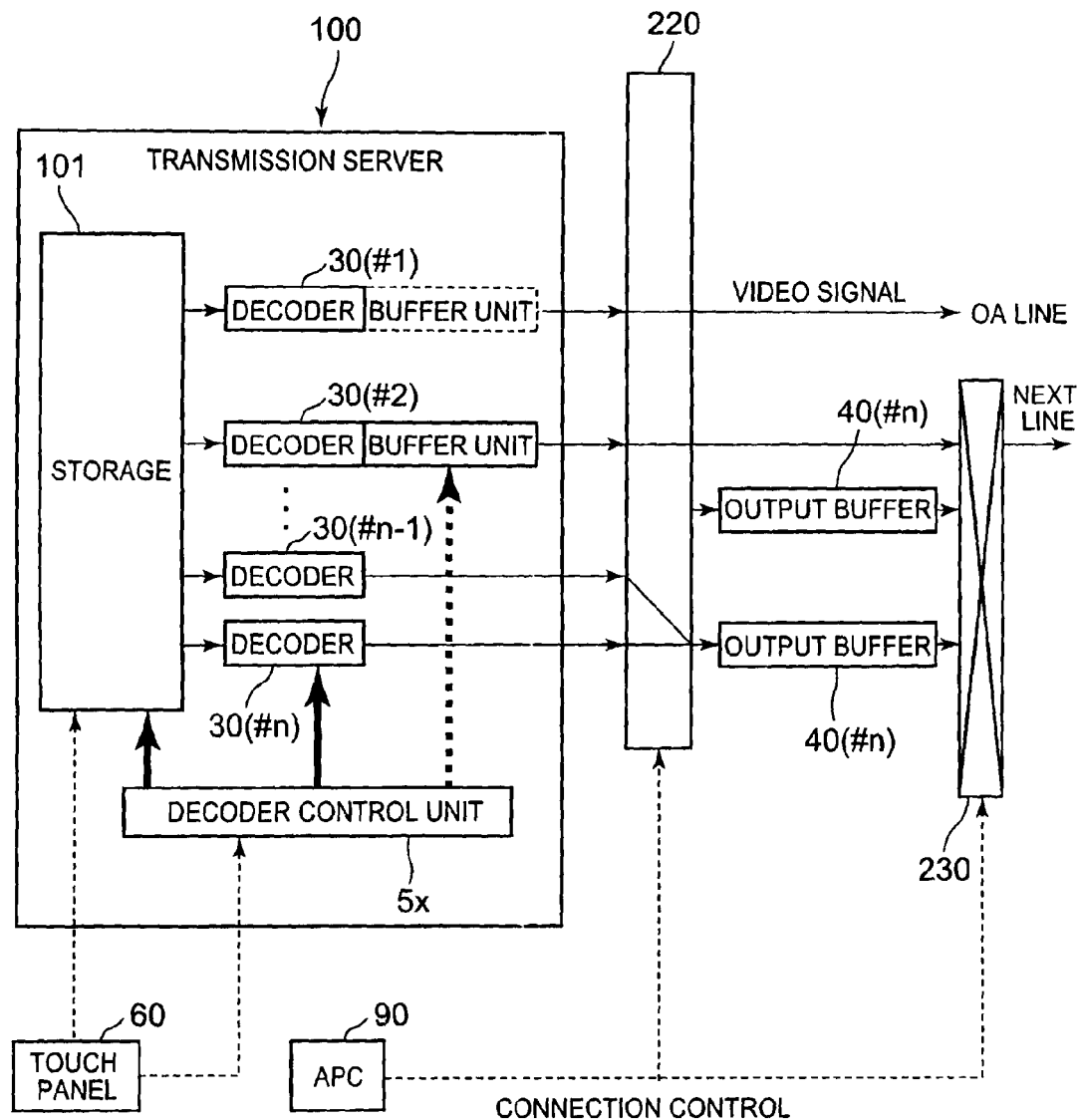
FIG. 13 is a functional block diagram for explaining an operation of an existing transmission server.

FIG. 11 shows an example in which the input/output control unit 6 in the video server according to the embodiment displays, in a system diagram, selections of content, a read port, and an output I/F port, and a video output mode by using a screen of a display 61. FIG. 12 is a flowchart of a processing procedure of the video server according to the embodiment that operates in a multi-mode operation manner.

In FIG. 11, a connection system corresponding to an operation of the video server including eight decoders is shown on the display 61.

With this configuration, the same number of video signals as that of the decoders can be output at the same time. Moreover, the video server has a capacity that is capable of simultaneously extracting eight pieces of content (channels) from the storage 1, and includes interfaces.

It should be noted that identification information such as the name or the like of the content stored in the storage 1 is listed in advance, and can be confirmed on another display (not shown) or the display 61 of the input/output control unit 6.

The output mode (operation mode) includes four modes, i.e., the OA mode, the NEXT mode, the fast-forward playback (FWD) mode, and the backward playback (BWD) mode. In the OA mode, content data on the air or content data read from the storage 1 is transmitted immediately. In the NEXT mode, the transmission of content to be broadcasted (transmitted) next to the content on the air (being transmitted) is stopped temporarily in a standby status. In the fast-forward playback mode, a user confirms content prior to the broadcast or after being transmitted. In the backward playback mode, the content is played back in a backward direction.

A port (channel) number is described in each circle to represent read ports of the storage 1, and input/output ports for each channel of the decoders 3(#1 to #8) and the output buffers 4(#1 to #8) in a memory unit 4M.

The output buffers 4 shown in FIG. 1, FIG. 2, and FIG. 11 immediately transmit video signals decoded by the decoders 3 in a case where a corresponding port of the output interface 8 is in the OA mode. Therefore, the output buffers 4(#1 and #7) are controlled by the connection control section 51 and the decoder control section 52 to transmit the signals without buffering. The video data obtained from the decoder 3(#2) is buffered (stored and kept temporarily) in the output buffer 4(#2) to keep the front data of the video data when the corresponding port of the output interface 8 is in the NEXT mode so that a random access to the video data can be performed at any time.

Here, each of two decoders 3 is connected to one of the output buffers 4 to easily play back and output data for every successive GOPs shown in FIG. 7, in the fast-forward playback mode. In the backward playback mode, playback for every a plurality of GOPs is not performed, but data that is decoded by the two decoders 3 alternately is output and combined before being input to one of the output buffers 4, as in FIG. 9.

In the following, a processing procedure of the video server that operates in a multi-mode operation manner will be described with reference to FIG. 11 and a flowchart of FIG. 12. Identification information on the content name (step s1), the output mode (step s2), and an output interface port number (step s3) is input and designated from the input/output control unit 6 to desired one of port description frames OM(#1 to #8) of the output I/F 8 (content description frames CN(#1 to #8) of the storage 1 in some cases) by an operator or via an external information transmission means that is not shown in FIG. 1, and is displayed on the display 61.

As an example of the designation method, there is a method in which characters or the like of content identification information (xxxO), output mode symbols (OA), and the like, which are desired to be output, are input by, for example, a keyboard of the display 61 to one of the port description frames OM that is desired to be allocated. It should be noted that the content name may be input and designated to a blank in the content description frames CN (#1 to #8) in the storage 1 on the screen.

Moreover, the content name, the output mode, and the like together with transmission time (timing) information are designated and input from the external APC 9 (see FIG. 1) to the video server S, in a broadcast station. Since the OA mode and the NEXT mode are changed at any time depending on an input signal from the outside, the output mode is input and designated only when the fast-forward playback (FWD) or the backward playback (BWD) is designated. The output mode is automatically set from the APC 9 without being input and designated for content whose broadcast is controlled by time information output from the APC 9.

As such an example, since content and OA time information are notified from the APC 9 via the input/output control unit 6 in advance, the controller of the video server S determines whether the content or the state of the port of the output I/F is on the air or is standby with reference to a timer or a clock (not shown), and sets the output mode to the OA mode or the NEXT mode Alternatively, according to another method, the APC 9 itself transmits a control signal that designates OA timing with reference to a station clock. So the OA mode or the NEXT mode may be input and set to the input/output control unit 6 by the control signal.

The connection control section 51 of the controller 5 includes a path search program, and the connection control section 51 monitors unused decoder 3, unused output buffers 4, and unused read ports of the storage 1. Then, the connection control section 51 determines conditions of whether two decoders are combined to be used or one decoder is used, and whether the output buffers are used or bypassed, based on the output mode of a video signal, which is designated in one of the port description frames OM of the output I/F 8. Moreover, one of the unused read ports is allocated as a read port for data of the designated content.

Then, as shown in FIG. 11, a connection pattern that is determined in advance corresponding to each output mode is set. A route that establishes a connection between the port of the output I/F and the allocated read port, from which content data is read, in the storage 1 via a currently unused decoder 3 and output buffer 4 is searched for with reference to the connection pattern, thereby setting destinations of the selectors A 21, B 22, and C 23, for example.

Moreover, the decoder control section 52 includes a decoding-process control program, and functions with the connection control section 51. For example, one of ports "1" to "8" of the output I/F 8, to each of which a mode for a video signal is set, is selected, and the fast-forward playback mode is thus set. In this case, the decoder control section 52 determines a combination of the decoders 3 alternately outputting video signals, determines the successive number of the GOPs to be played back by each decoder based on the fast-forward speed that is input and designated independently, determines the GOPs to be referred to, and controls setting of input to the output buffers or output of data decoded by the decoders 3.

Moreover, the decoder control section 52 controls the operations of the decoders and the output buffers similarly in the backward playback.

When "xxxA" that represents the content A and "OA" that represents the OA mode are input to the port wiring frame OM (#1) of the port "1" of the output I/F 8, the connection control section 51 of the controller 5 determines that the operation mode of the port "1" is "OA mode" (Yes in Step s4), and a condition in which one decoder is used and the output buffer is bypassed is set. Then, the path search program of the connection control section 51 checks the use statuses of the read ports of the storage 1, the output buffers 4, and the decoders 3, which have not used until then, and sets the selector C 23, the selector B 22, and the selector A 21 so that connections between an unused port "1" of the output I/F 8 and an unused output port "1" of the output buffer 4(#1), between an unused input port "1" of the output buffer 4(#1) and an unused output port "1" of the decoder 3(#1), and between an unused input port "1" of the decoder 3(#1) and an unused read port "1" of the storage 1 are established.

At the same time, the decoder control section 52 allocates a read port for the content A stored in the storage 1 to the read port "1", allocates a function to decode and output normal read data to the decoder 3(#1), and allocates a function to output data without buffering is to the output buffer 4(#1) (step s5).

When "xxxB" and "NXT" are input and designated to the port description frame OM (#2) of the port "2" of the output I/F 8, in other words, when the "content B" being the next program to be broadcasted and the NEXT mode are allocated to the port "2" of the output I/F 8 (No in step s4 and Yes in step s6), the connection control section 51 determines that the output mode is the NEXT mode and controls each selector to set each port: to "2" as in the case of the OA mode described above.

Here, the decoder control section 52 allocates a read port for the content B stored in the storage 1 to "2", instructs a method for decoding normal read data to the decoder 3(#2), and allocates, to the output buffer 4(#2), an operation to buffer the front data of the output decoded data of the designated content and wait (step s7).

When "xxxD" and the fast-forward playback mode "FWD" are designated and input: to the port description frame OM(#5) of the output I/F 8 to monitor and confirm the "content D" stored in the storage 1 (No in step s4, No in step s6, and Yes in step s8), the connection control section 51 sets each selector to connect an output port "5" of the output buffer 4(#5) and an output port "6" of the output buffer 4(#6) to a port "5" of the output I/F 8, connect an input port "5" of the output buffer 4(#5) to an output port "5" of the decoder 3(#5), connect an input port "6" of the output buffer 4(#6) to an output port "6" of the decoder 3(#6), and connect an input port "5" of the decoder 3(#5) and an input port "6" of the decoder 3(#6) to a read port "5" of the storage 1.

In this case, the selector C 23 switches destinations so as to extract data output from the output buffer 4(#5) and data output from the output buffer 4(#6) alternately for every three GOPs. Alternatively, the selector C 23 does not need to perform the alternate switching, and the decoder control section 52 may control the decoder 3(#5) and the decoder 3(#6) to alternately output decoded data for every three GOPs.

In this FWD mode, the decoder control section 52 sets the read port "5" of the storage 1 to output the "content D", and allocates a decoding method for performing the fast-forward playback shown in FIG. 7 to the decoders 3(#5, #6) (step s9).

Similarly, the assumption is made that "xxxC" and the backward playback mode "BWD" are designated to the port description frame OM (#3) of the output I/F 8 to monitor and confirm the "content C" stored in the storage 1 in the backward playback (No in step s8). In this case, the connection control section 51 sets each selector to connect an output port "3" of the output buffer 4(#3) to a port "3" of the output I/F 8, connect an input port "3" of the output buffer 4(#3) to an output port "3" of the decoder 3(#3) and an output port "4" of the decoder 3(#4), and connect an input port "3" of the decoder 3(#3) and an input port "4" of the decoder 3(#4) to a read port "3" of the storage 1. In this case, the selector B 22 performs an operation to extract data output from the decoder 3(#3) and data output from the decoder 3(#4) alternately. Alternatively, the selector B 22 does not need to perform the alternate switching, and the decoder control section 52 may control the decoder 3(#3) and the decoder 3(#4) to alternately output decoded data for a GOP.

In this BWD mode, the decoder control section 52 sets the read port "3" of the storage 1 to output the "content C", and allocates a decoding method for performing the backward playback shown in FIG. 9 to the decoders 3(#3 and #4) (step s10).

It should be noted that, in the fast-forward playback, the connection control section 51 may set the connection pattern to make a common connection between the inputs of the two decoders before connecting the connected inputs to the output buffer, in FIG. 11. Furthermore, in the backward playback, the connection control section 51 may set the connection pattern to store data output from the decoders in the buffers, respectively, and to combine data output from the buffers. In this case, the decoder control section 52 is adjusted so as to be able to establish a desired playback output mode depending on each connection order and combination.

In addition to this, the same content E can be output from a plurality of output ports in the OA mode by setting the destination by using the selector, for example. The setting of the destination by the selector may be automatically performed by the path search program. Alternatively, the destination may be designated by the operator dragging between ports with a mouse pointer.

In order to control this connection or the input of the content information, an information terminal (not shown) such as a computer may be used, or a numerical value or a connection point may be designated by a touch panel or a mouse pointer. Alternatively, input devices such as a keyboard, a mouse, a button, and a joystick, which are interlocked with the display 61 may be combined to perform the control.

The connection paths are displayed with thick lines on the display, and the available decoders 3 and the like are also displayed. In this example, since some of the decoders are combined to be used, all the decoders are in use. Therefore, the output I/F is not able to output more than seven channels. In this regard, when a further output of the output I/F 8 is not able to be used, the path search program executed in the controller 5 notifies the operator of that by displaying the portions of the ports in a pale color on the display 61.

Similarly, because a further content is not able to be output, it is displayed that the storage is in a maximum transmission state by displaying the content frame in a pale color.

According to the video server of at least one of the embodiments described above, selectors are provided between storage, a plurality of decoders, and a plurality of output interfaces. The selectors connect the storage, the plurality of decoders, and the plurality of output interfaces in a manner that the selectors combine some decoders so that data can be transmitted in a plurality of output modes. As a result, it is possible to output video signals in a fast-forward playback or a backward playback to confirm whether video content is stored properly while reading other stored video content data and transmitting the data immediately (in the OA mode).

These embodiments have been presented by way of example only, and are not intended to limit the scope of the invention. Indeed, the novel methods and systems described herein may be embodied in a variety of the other forms; furthermore, various omissions, substitutions and changes in the form, the methods and systems described herein may be made without departing from the spirit of the inventions. The accompanying claims and their equivalents are intended to cover such forms or modifications as would fall within the scope and spirit of the inventions.

For example, although the number of channels of the output I/F, the number of the decoders, and the number of the read ports of the storage 1 are the same, i.e., eight, in the description, the embodiments include a case where the numbers are different, e.g., 6, 4, 8, respectively. In particular, since outputs of two channels, i.e., the OA mode and the NEXT mode, are necessary in principle in a broadcast station, it is desirable to have output ports of at least four channels to be able to confirm content in the fast-forward playback mode or in the backward playback mode during the operation.

Moreover, the playback speed of the fast-forward playback or the backward playback is adjusted to 0.5 to 1.5 in some cases. Although the detailed description is omitted, the input/output control unit 61 inputs an adjustment parameter to the controller 6, and control of processing, such as an adjustment of a clock speed for each decoder, data insertion, and data thinning, which is determined separately, is performed.

What is claimed is:

1. A video server for multi-channel output, the video server being configured to transmit a plurality of pieces of video information, comprising:
   a plurality of output interface ports for video information, each of the plurality of output interface ports having an identification number;
   storage capable of storing a plurality of pieces of content data, the storage including a plurality of read ports, the storage being configured to output designated content data from an allocated read port;
   a plurality of decoders configured to decode and output the input designated content data, each of the plurality of decoders having unique identification information;
   a plurality of output buffers configured to buffer the data and output the buffered data, or to output the data without buffering, in accordance with a decode processing mode, the data being input via at least one of the plurality of decoders, each of the plurality of output buffers having unique identification information;
   a first selector configured to selectively establish connection between at least one of the read ports of the storage and at least one of inputs of the plurality of decoders in accordance with a control signal, the control signal setting a destination to be input;
   a second selector configured to selectively establish connection between at least one of outputs of the plurality of decoders and at least one of inputs of the plurality of output buffers in accordance with the control signal;
   a third selector configured to selectively establish connection between at least one of outputs of the plurality of output buffers and at least one of the plurality of output interface ports in accordance with the control signal;
   an input device configured
      to input a content name of the video information, the video information being output from each of the output interface port, and
      to designate an output mode of the video information to one of an OA mode, a NEXT mode, a fast-forward playback mode, and a backward playback mode, the video information being output from the output interface port; and
   a controller configured
      to receive the output mode designated by the input device,
      to set a connection pattern based on each of the output modes, the connection pattern including combination between the plurality of decoders and the plurality of output buffers, the plurality of decoders decoding data,
      to set the decode processing mode, the decode processing mode including a combination of allocation, a decoding method, and a buffering method, the allocation indicating which read port of the storage the designated content is output from, the decoding method being for the plurality of decoders, the buffering method being for the plurality of output buffers, the decoding method and the buffering method being based on each of the output modes, and
      to output the control signal with reference to each piece of the identification information depending on the set connection pattern and the set decode processing mode so that connection between the output interface port and the allocated read port is established, the control signal setting the destination of each of the selectors.

2. The video server according to claim 1, wherein
the connection between each of the plurality of read ports and the input of each of the plurality of decoders, the connection between the output of each of the plurality of decoders and the input of each of the plurality of output buffers, and the connection between the output of each of the plurality of output buffers and the one of the plurality of output interface ports are established by a data bus, data related to the video information being transmitted through the data bus, and
the controller is configured to control address information and timing information to cause the data bus to function as the selectors based on the connection pattern, the address information controlling a data transmission path of the data bus, the timing information controlling transmission timing, the selectors establishing connection between one of the plurality of interface ports and the allocated read port.

3. The video server according to claim 1, wherein
the controller is configured, in the fast-forward playback mode,
   to set each of the selectors so that an input of each of two decoders is connected to the same read port of the storage, an output of each of the two decoders is connected to a different input of each of the plurality of output buffers, and the output of each of the plurality of output buffers is connected to a common one of the plurality of output interface ports, and
   to control the video server so that the two decoders decode data for every a plurality of predetermined successive group of pictures and output the decoded data, the decoded data are combined alternately, and one of the plurality of output interface ports outputs the combined data, the combined data corresponding to an original order of the group of pictures.

4. The video server according to claim 1, wherein
the controller is configured, in the fast-forward playback mode, to set each of the selectors so that an input of each of two decoders is connected to the same read port of the storage, an output of each of the two decoders is connected to a common input of the plurality of output buffers, and the output of each of the plurality of output buffers is connected to one of the plurality of output interface ports, and to control the video server so that the two decoders decode data for every a plurality of predetermined successive group of pictures and output the decoded data, the decoded data are combined alternately, and one of the plurality of output interface ports outputs the combined data, the combined data corresponding to an original order of the group of pictures.

5. The video server according to claim 1, wherein the controller is configured, in the backward playback mode, to set each of the selectors so that an input of each of two decoders is connected to the same read port of the storage, an output of each of the two decoders is connected to a common input of the plurality of output buffers, and the output of each of the plurality of output buffers is connected to one of the plurality of output interface ports, and to control the video server so that the two decoders decode data in a backward direction for every two successive group of pictures and output the decoded data, the decoded data are combined alternately, and one of the output interface ports outputs the combined data, the combined data corresponding to a reverse order from an original order of the group of pictures.

6. The video server according to claim 1, wherein the controller is configured, in the backward playback mode, to set each of the selectors so that an input of each of two decoders is connected to the same read port of the storage, an output of each of the two decoders is connected to a different input of the plurality of output buffers, and the output of each of the plurality of output buffers is connected to a common output interface port, and to control the video server so that the two decoders decode data in a backward direction for every two successive group of pictures and output the decoded data, the decoded data are combined alternately, and one of the output interface ports outputs the combined data, the combined data corresponding to a reverse order from an original order of the group of pictures.

7. A video signal output control method by a video server for multi-channel output, the video server being configured to transmit a plurality of pieces of video information, the video server including an input device, a controller, storage, a plurality of decoders, a plurality of output buffers, a first selector, a second selector, a third selector, and a plurality of output interface ports, the method comprising:

notifying, by the input device, the controller of
designation of an input content name of content data to be output from one of the plurality of output interface ports to be designated, and designation of a selection of an output mode of each of the plurality of pieces of video information to one of an OA mode, a NEXT mode, a fast-forward playback mode, and a backward playback mode, one of the plurality of output interface ports outputting the video information;

receiving, by the controller, the output mode notified by the input device, setting, by the controller, a connection pattern based on each of the output modes, the connection pattern including combination between the plurality of decoders and the plurality of output buffers, setting, by the controller, a decode processing mode, the decode processing mode including a combination of allocation, a decoding method, and a buffering method, the allocation indicating which read port of the storage the designated content is output from, the decoding method being for a decoder connected to the allocated read port, the decoding method being based on each of the output modes, the buffering method being for the plurality of output buffers, and performing, by the controller, connection setting of the first selector, the second selector, and the third selector depending on the set connection pattern and the set decode processing mode so that connection between the designated output interface port and the allocated read port is established;

outputting, by the storage, the designated content data to the allocated read port, the storage being capable of storing a plurality of pieces of content data;

establishing, by the first selector, connection between the read ports of the storage and inputs of the plurality of decoders in accordance with the connection setting;

establishing, by the second selector, connection between outputs of the plurality of decoders and inputs of the plurality of output buffers in accordance with each of the connection setting;

establishing, by the third selector, connection between outputs of the plurality of output buffers and the plurality of each output interface ports in accordance with the connection setting;

decoding, by the decoder connected to the read port via the first selector, input content data depending on the set output mode, and outputting the data obtained by decoding;

buffering data input from the decoder and outputting the buffered data, or outputting data input from the decoder without buffering, by the output buffer connected to the decoder via the second selector, by a method corresponding to the set decode processing mode; and outputting, by the plurality of interface ports connected to the output buffer via the third selector, the data obtained by decoding the designated content data as the video information.

8. The video signal output control method by the video server according to claim 7, wherein a path search program causes the controller
to monitor which read port, decoder, and buffer are in use, to generate the connection pattern based on the designation of the selection of one of the OA mode, the NEXT mode, the fast-forward playback mode, and the backward playback mode, and to establish connections between the read port, the plurality of decoders, the plurality of output buffers, and the plurality of output interface ports, which are not in use, with reference to the generated connection pattern to perform the connection setting of each of the selectors.

* * * * *